United States Patent

Daudel et al.

(10) Patent No.: US 6,220,031 B1
(45) Date of Patent: Apr. 24, 2001

(54) EXHAUST GAS TURBOCHARGER FOR AN INTERNAL-COMBUSTION ENGINE AND METHOD OF OPERATING SAME

(75) Inventors: Helmut Daudel, Schorndorf; Siegfried Sumser, Stuttgart, both of (DE)

(73) Assignee: DaimlerChrysler AG, Stuttgart, DE (US)

( * ) Notice: Subject to any disclaimer, the term of this patent is extended or adjusted under 35 U.S.C. 154(b) by 0 days.

(21) Appl. No.: 09/384,290

(22) Filed: Aug. 26, 1999

(30) Foreign Application Priority Data

Sep. 26, 1998 (DE) .............................. 198 38 754

(51) Int. Cl.[7] .................................................. F02D 23/00
(52) U.S. Cl. .......................... 60/602; 415/204; 415/206; 415/160; 415/159; 415/164; 415/157; 415/158
(58) Field of Search ............................. 60/602; 415/160, 415/159, 164, 157, 158, 204, 206

(56) References Cited

U.S. PATENT DOCUMENTS

| | | | |
|---|---|---|---|
| 1,197,761 | * 9/1916 | Pfau | 415/164 |
| 3,784,318 | * 1/1974 | Davis | 415/158 |
| 4,355,953 | * 10/1982 | Nelson | 415/164 |
| 4,403,913 | * 9/1983 | Fisker | 415/164 |
| 4,629,396 | * 12/1986 | Lorett | 415/164 |
| 4,695,220 | * 9/1987 | Dawson | 415/160 |
| 5,346,359 | * 9/1994 | Propst | 415/160 |
| 5,441,384 | * 8/1995 | Gokhman | 415/164 |
| 5,454,225 | * 10/1995 | Sumser et al. | 60/602 |
| 5,758,500 | * 6/1998 | Sumser et al. | 60/602 |
| 6,050,775 | * 4/2000 | Erdmann et al. | 415/164 |

FOREIGN PATENT DOCUMENTS

| | | |
|---|---|---|
| 4330487C1 | 1/1995 | (DE) . |
| 19615237A1 | 10/1997 | (DE) . |
| 19727140C1 | 12/1998 | (DE) . |
| 2035467 | * 6/1980 | (GB) .............................. 415/206 |
| WO84/04136 | 10/1984 | (WO) . |

* cited by examiner

Primary Examiner—Thomas Denion
Assistant Examiner—Thai-Ba Trieu
(74) Attorney, Agent, or Firm—Evenson, McKeown, Edwards & Lenahan, P.L.L.C.

(57) ABSTRACT

An exhaust gas turbocharger for an internal-combustion engine, whose exhaust gas turbine has a rotor disk with at least one semiaxial and one radial flow inlet cross-section, and is provided with a variable turbine geometry for the variable adjustment of at least one flow inlet cross-section. Furthermore, a compressor is provided in the intake system of the internal-combustion engine. In order to improve the efficiency of the exhaust gas turbocharger in a wide operating range, the ratio of the compressor outlet diameter to the average turbine inlet diameter can be variably adjusted according to the adjustment of the variable turbine geometry between a minimal value and a maximal value, the minimal value being lower than 1.1.

27 Claims, 2 Drawing Sheets

EXHAUST GAS TURBOCHARGER FOR AN INTERNAL-COMBUSTION ENGINE AND METHOD OF OPERATING SAME

BACKGROUND AND SUMMARY OF THE INVENTION

This application claims the priority of German application 198 38 754.7, filed in Germany on Aug. 26, 1998, the disclosure of which is expressly incorporated by reference herein.

The invention relates to an exhaust gas turbocharger for an internal-combustion engine whose exhaust gas turbine has a rotor disk with at least one semiaxial and one radial flow inlet cross-section and is equipped with a variable turbine geometry for the variable adjustment of at least one flow inlet cross-section, and having a compressor in the intake system of the internal-combustion engine, the ratio $(D_v/D_{T,m})$ of the compressor outlet diameter $(D_v)$ to the average turbine inlet diameter $(D_{T,m})$ according to the adjustment of the variable turbine geometry being variably adjustable between a minimal value and a maximal value.

From German Patent Document DE 43 30 487 C1, an exhaust gas turbocharger for a combustion engine is known whose exhaust gas turbine has a rotor disk with a semiaxial and a radial flow inlet cross-section. In the area of the semi-axial flow inlet cross-section, rigid guide baffles are arranged, but in the area of the radial flow inlet cross-section, guide baffles with adjustable guide blades are arranged by way of which the surface of the radial flow inlet cross-section can be varied as a function of the guide blade position.

In the starting operation, the radial guide baffles are changed into the shut-off position so that the radial inflow to the rotor disk is blocked and the exhaust gas current flows through the semiaxial flow inlet cross-section to the rotor disk and impacts at a fluidically favorable angle onto the rotor disk. In the partial load range and full load range, the radial guide baffles are opened up so that a higher fraction of the exhaust gas current flows through the radial flow inlet cross-section.

The variable turbine geometry, which is implemented by way of the adjustable radial guide baffles, can be used in the engine braking operation for increasing the braking performance. For this purpose the guide blades are changed into the ram position which results in the buildup of a high exhaust gas back pressure. At the same time, exhaust gas flows at a high flow rate through the ducts between the guide blades or through the semiaxial flow cross-section and acts upon the turbine wheel, whereby the compressor output is increased and the combustion air supplied to the engine is subjected to excess pressure by the compressor.

As the result, the cylinder is acted upon with increased supercharging pressure on the inlet side. On the outlet side, an excess pressure exists between the cylinder outlet and the exhaust gas turbocharger which counteracts the blowing-off of the air compressed in the cylinder by way of decompression valves into the exhaust gas pipe system. In the engine braking operation, the piston must carry out compression work in the compression and push-out stroke against the high excess pressure in the exhaust gas pipe system, whereby a strong braking effect is achieved.

With respect to additional prior art, reference is made to German Patent Document DE 196 15 237 A1, International Patent Document WO 84/04136 and German Patent Document DE 197 27 140 C1 which was published later.

The invention is based on the problem of improving the efficiency of an exhaust gas turbocharger of the above-mentioned type in a broad operating range.

According to the invention, this problem is solved by providing an arrangement of the above-noted type wherein wherein the minimal value is lower than 1.1 and the average turbine inlet diameter $(D_{T,m})$ is calculated according to the equation $$D_{T,m}=D_{T,x}+(D_{T,r}-D_{T,x})*A_{T,r}/(A_{T,r}+A_{T,x})$$

wherein $D_{T,x}$ is the semiaxial turbine inlet diameter $D_{T,r}$ is the radial turbine inlet diameter $A_{T,r}$ is the area of the radial flow inlet cross-section $A_{T,x}$ is the area of the semiaxial flow inlet cross-section, and wherein the ratio of the semiaxial flow inlet cross-section area to the radial flow inlet cross-section area when the semiaxial and radial flow paths are fully open amounts to approximately 0.1.

With respect to the fired operation of exhaust gas turbines, it must be taken into account that a large turbine wheel diameter results in efficiency advantages in the upper engine rotational speed range. Possible disadvantages of large turbine wheel diameters with respect to the fuel consumption, which may be the result of the higher inertia of the rotor disk, are overcompensated by the retaining possibility of the variable guide baffles. It was found that, at a ratio of the compressor wheel diameter to the turbine wheel diameter of maximally 1.1, the advantages of a large turbine wheel diameter prevail by far.

For calculating the ratio of the compressor wheel to the turbine wheel, an average value is first determined for the turbine wheel diameter. With a different weighting, the semiaxial turbine inlet diameter and the radial turbine inlet diameter are included in the calculation of the average value, for the weighting of these two components, the ratio of the surface of the radial flow inlet cross-section to the sum of the semiaxial and radial flow inlet cross-section being used. The semiaxial or radial flow inlet cross-section corresponds to the guide baffle outlet surface in the semiaxial or radial inflow. The average turbine wheel diameter is then used as the basis for calculating the ratio of the compressor wheel to the turbine wheel.

The maximal value of the ratio of the compressor wheel to the turbine wheel is reached when the average turbine wheel diameter becomes minimal. This is the case if the larger fraction of the exhaust gas flow rate is guided through the inflow with the smaller radial distance from the turbine axis—as a rule, the semiaxial inflow—. Inversely, the minimal value of the ratio of the compressor wheel to the turbine wheel is reached when the average turbine wheel diameter becomes maximal, which normally occurs in the case of a preferred radial inflow.

The average value of the turbine wheel diameter is no constant value but, because of the variable weighting factors, may vary according to the position of the variable turbine geometry between a maximal value and a minimal value. Accordingly, by way of the variable turbine geometry, the average value of the turbine wheel diameter can be set. The minimal value of the ratio of the compressor wheel to the turbine wheel, according to the invention, must not exceed the 1.1 value which means that the turbine wheel diameter must have a minimal value in relationship to the compressor wheel diameter.

As a result, the turbine of an exhaust gas turbocharger having a variably adjustable geometry can be optimally adjusted according to the efficiency improvement and consumption reduction criteria. Because of the variability of the turbine wheel diameter, instead of a single operating point, an operating range can be covered now which, in the case of a low load and rotational speed, is displaced in the direction of a more favorable fuel consumption and, in the partial load and full load range, is in the range of an optimal efficiency.

Because of the variability of the average turbine wheel diameter, this may also be called a quasi-variable turbine wheel which has the same characteristics as a turbine wheel whose diameter can be physically variably adjusted but which is not equipped with the complicated geometry and kinematics of a variable turbine wheel. The average turbine wheel diameter has the significance of a hypothetical diameter whose variation takes place by a semiaxial or radial approach flow of different intensity.

The calculation of the average value of the turbine wheel diameter is independent of the selection of the variable turbine geometry. When radial guide baffles with adjustable guide blades are used and when an axial slider is used in the semiaxial turbine inlet or when both above-mentioned shut-off devices are used, the relationship for the average value of the turbine wheel diameter can be used and can be the basis of the determination of the ratio of the compressor wheel diameter to the turbine wheel diameter. Optionally, a flap turbine can also be used.

In the case of a preferably selected minimal value of at least 0.9, but lower than 1.0, and a maximal value of 1.2, the ratio of the compressor wheel diameter to the turbine wheel diameter can be varied in a bandwidth of between at least 0.9 and maximally 1.2. This bandwidth sweeps over the efficiency maximum of the turbine.

If the minimal value is set to lower than 1.0, the hypothetical turbine wheel diameter in the position of the shut-off device of the variable turbine geometry which corresponds to this minimal value is larger than the compressor wheel diameter. The average diameter of the turbine wheel exceeds the diameter of the compressor wheel.

By way of the shut-off device of the variable turbine geometry, the exhaust gas flow rates to the turbine rotor disk can be adjusted. According to the shut-off device and the position of the shut-off device, differently large flow rates flow by way of the semiaxial inflow and the radial inflow to the rotor disk. The flow rates can additionally be influenced by the ratio of the semiaxial and the radial flow inlet cross-sections. The ratio of 0.1 of the semiaxial to the radial flow inlet cross-section when the guide baffles are open was found to be advantageous because, at this ratio, the semiaxial inflow has a narrow cross-section and, even at low exhaust gas back pressures, relatively high flow velocities can be reached in the semiaxial ring nozzle.

If radial guide baffles with adjustable guide blades are used in the area of the radial inflow as variable turbine geometry, the maximal value of the ratio of the compressor wheel to the turbine wheel is expediently reached when the guide baffles are closed; the minimal value is reached when the guide baffles are open.

The same applies to the use of an axial slider in the area of the radial inflow.

However, in another advantageous embodiment, a shut-off device can also be used in the area of the semiaxial inflow, in this case, the maximal value being reached when the shut-off device is open and the minimal value being reached when the shut-off device is closed.

Optionally, shut-off devices may be inserted in the semi-axial inflow as well as in the radial inflow.

In another solution according to the invention, an average wheel inlet angle is determined from a different weighting of the semiaxial and radial wheel inlet angle with respect to the turbine rotor disk. For the optimal adjustment for the semi-axial and the radial, in each case, ring-nozzle-shaped inflow, a range for the average wheel inlet angle of approximately 20 to 90° is defined. The wheel inlet angle represents another degree of freedom which, in addition to the ratio of the compressor wheel to the turbine wheel, can be taken into account during the dimensioning.

Other objects, advantages and novel features of the present invention will become apparent from the following detailed description of the invention when considered in conjunction with the accompanying drawings.

DETAILED DESCRIPTION OF THE DRAWINGS

Figure 1:
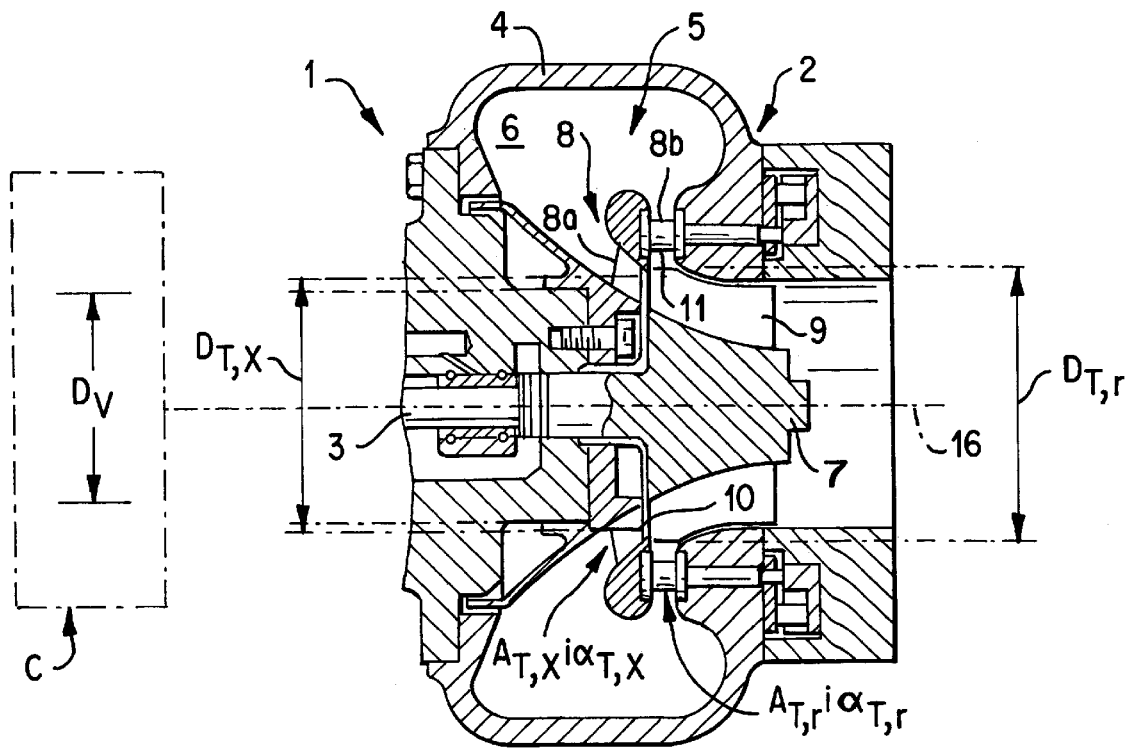
FIG. 1 is a sectional view of an exhaust gas turbine with a semiaxial and radial inflow and with radial guide baffles, constructed in accordance with a preferred embodiment of the invention.

The exhaust gas radial flow turbine 2 of an exhaust gas turbocharger 1 illustrated in FIG. 1 is driven by the exhaust gases of an internal-combustion engine of a utility vehicle or of a passenger car. The movement of a turbine rotor disk 7 is transmitted by way of a shaft 3 to a compressor C of the turbocharger which is placed in the intake pipe system and, for increasing the power of the internal-combustion engine, compresses taken-in fresh air to an increased supercharging pressure.

The turbine 2 has a single-channel spiral-shaped turbine housing 4 in which a flow duct 5 with a channel 6 is constructed. By way of the channel 6, the exhaust gas is guided to a ring-nozzle-shaped mouth area 8 with a semiaxial, ring-nozzle-shaped inflow 8a and a radial ring-nozzle-shaped inflow 8b, the inflows 8a, 8b being arranged directly in front of the turbine blades 9 of the rotor disk 7 and having flow inlet cross-sections $A_{T,x}$ or $A_{T,r}$. The semiaxial inflow 8a is arranged at a larger radial distance from the turbine axis 16 than the radial inflow 8b.

In the semiaxial inflow 8a a rigid grid 10 is situated; in the radial inflow 8b, variable guide baffles are arranged. The flow inlet cross-section $A_{T,x}$ in the area of the semiaxial inflow 8a is constant and invariable; whereas the flow inlet cross-section $A_{T,r}$ in the area of the radial inflow 8b varies as a function of the position of the guide baffles 11. The flow inlet cross-sections $A_{T,x}$ or $A_{T,r}$ correspond to the outlet surfaces of the rigid grid 10 and the guide baffles 11. In the shut-off position of the radial guide baffles 11—when the flow through the radial inflow 8b is completely blocked—the radial flow inlet cross-section $A_{T,r}$ is zero. In the opening position of the radial guide baffles 11, the radial flow inlet cross-section $A_{T,r}$ assumes a maximum.

The semiaxial turbine inlet diameter $D_{T,x}$ marks the average diameter of the turbine blades 9 in the area of the semiaxial flow inlet cross-section $A_{T,x}$. The radial turbine inlet diameter $D_{T,r}$ indicates the diameter of the turbine blades 9 in the area of the radial flow inlet cross-section $A_{T,r}$. The semiaxial as well as the radial turbine inlet diameter $D_{T,x}$ and $D_{T,r}$ are constant values which depend on the selection of the turbine but are otherwise not variable.

From the semiaxial and the radial turbine inlet diameter $D_{T,x}$ and $D_{T,r}$ as well as the flow inlet cross-sections $A_{T,x}$ and $A_{T,r}$, according to the equation $$D_{T,m} = D_{T,x} + (D_{T,r} - D_{T,x}) * A_{T,r}/(A_{T,r} + A_{T,x})$$

an average turbine inlet diameter $D_{T,m}$ can be calculated which is the basis of the calculation of the $D_v/D_{T,m}$ ratio as the adaptation quotient of the compressor outlet diameter $D_v$ and the average turbine inlet diameter $D_{T,m}$. On the basis of the variable radial flow inlet cross-section $A_{T,r}$, according to the position of the guide baffles 11, the ratio $D_v/D_{T,m}$ can assume different values. The diameters are selected such that the minimal value of the $D_v/D_{T,m}$ ratio, which is reached when the radial guide baffles 11 are open, becomes lower than 1.1; in the case of large-volume engines, as used, for example, in utility vehicles, it may become lower than 1.0. This means that the average hypothetical diameter of the turbine rotor disk in the position of the variable guide baffles which corresponds to the minimal value is slightly lower (minimal value 1.1) or even larger (minimal value lower than 1.0) than the diameter of the compressor rotor disk. The maximal value of the ratio of $D_v/D_{T,m}$ is reached in the shut-off position of the guide baffles 11, in which the radial flow inlet cross-section $A_{T,r}$ becomes zero or becomes a minimum and the average turbine inlet diameter $D_{T,m}$ also assumes a minimum. Inversely, the minimal value of the ratio of $D_v/D_{T,m}$ is reached in the open position of the guide baffles 11 because now the radial flow inlet cross-section $A_{T,r}$ as well as the average turbine inlet diameter $D_{T,m}$ reach a maximum. The minimal value of the ratio advantageously amounts to at least 0.9; the maximal value is between 1.0 and 1.2. A preferred range is between 0.98 and 1.09.

Optionally, the maximal value may also be lower than 1.0.

The operating range depends on the cubic capacity of the internal-combustion engine. In the case of large-volume utility vehicles, the minimal value may be under 1.0; in the case of small-volume passenger cars, it may be under 1.1.

By means of the adjustable guide baffles in the area of the semiaxial and/or radial inflow 8a, 8b, the ratio between the semiaxial and the radial exhaust gas partial flow to the rotor disk of the turbine can be adjusted. Since the turbine diameters $D_{T,x}$ and $D_{T,r}$ have different sizes in the semiaxial and the radial inflow, this is equal to a change of the diameter of the turbine rotor disk. As a result, the operating characteristics of the turbine can be adjusted according to the situation in the continuous operation.

Expediently, the ratio of the semiaxial to the radial flow inlet cross-section amounts to approximately 1.0 so that the semiaxial flow inlet cross-section takes up only 10% of the surface of the radial flow inlet cross-section in the open position of the guide baffles 11. In the shut-off position of the radial guide baffles 11, the total exhaust gas flow must flow through the semiaxial inflow 8a, in which case, because of the narrow cross-section of this flow path, high exhaust gas flow rates are reached, so that the exhaust gas impacts on the turbine rotor disk with a high flow impulse.

As also illustrated in FIG. 1, baffle outlet angles $\alpha_{T,x}$ and $\alpha_{T,r}$ are assigned to the flow inlet cross-sections $A_{T,x}$ and $A_{T,r}$. The semiaxial baffle outlet angle $\alpha_{T,x}$, which indicates the angle at which the flow flows through the semiaxial baffles 10 and impacts on the circumference of the rotor disk 7, is invariable when rigid baffles are used in the semiaxial inflow 8a.

Figure 2:
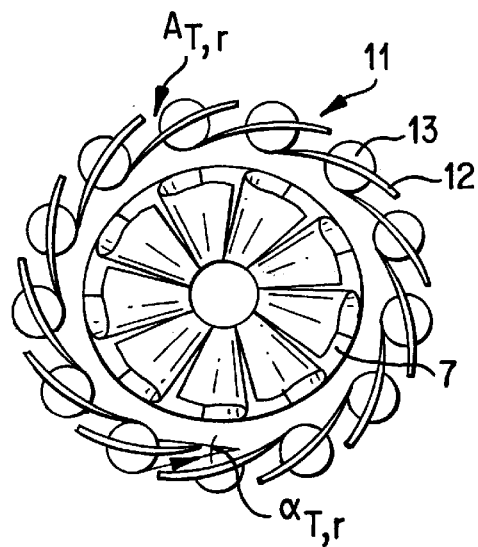
FIG. 2 is a frontal schematic view of the turbine rotor disk showing radial guide baffles of the exhaust gas turbine of FIG. 1.

As indicated in FIG. 2, the radial baffle outlet angle $\alpha_{T,r}$ indicates the angle in the area of the variable guide baffles 12 at which the flow between adjacent guide blades 12, which are fastened on rotatable guide shafts 13, flows in with respect to a tangent to the circumference of the rotor disk 7. The size of the radial baffle outlet angle $\alpha_{T,r}$ varies according to the position of the guide blades 12, in which case the radial flow inlet cross-section $A_{T,r}$ between adjacent guide blades 12 can be expressed as a function of the radial baffle outlet angle $\alpha_{T,r}$. In the shut-off position of the radial guide baffles 11, the radial flow inlet cross-section $A_{T,r}$ and the radial baffle outlet angle $\alpha_{T,r}$ are zero; in the maximal opening position, both values assume a maximum.

Figure 3:
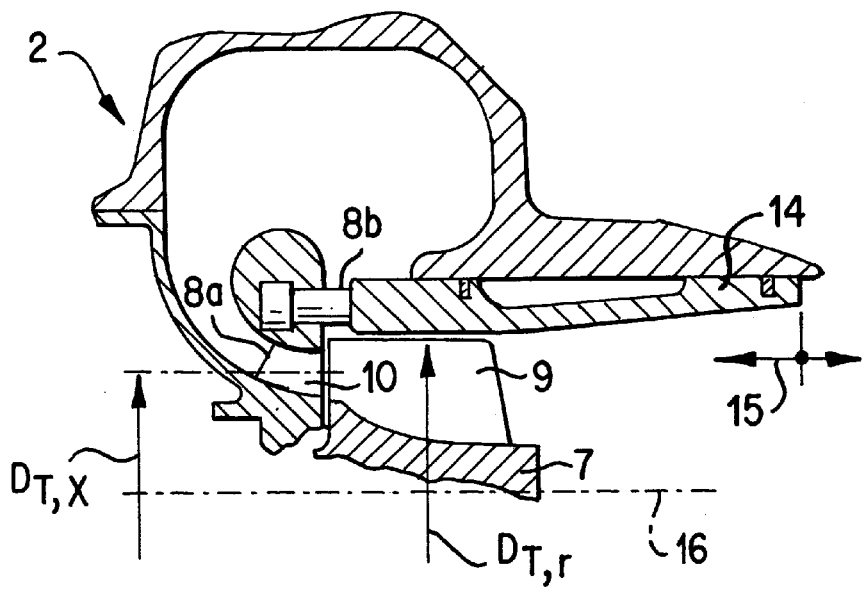
FIG. 3 is a sectional view of an exhaust gas turbine with an axial slider, and constructed according to another preferred embodiment of the invention.

In the modified embodiment according to FIG. 3, the variable turbine geometry of the turbine 2 is constructed as an axial slider 14 which is arranged in the radial inflow 8b and whose axial adjusting movement 15 between the opening and shut-off position extends in parallel to the turbine axis 16. Rigid baffles 10 are arranged in the semiaxial inflow 8a. Depending on the position of the axial slider 14, the exhaust gas flows are divided between the semiaxial and the radial inflow 8a and 8b and impact on the guide blades 9 of the rotor disk 7. The average turbine inlet diameter $D_{T,m}$ is determined in the same manner as in the first embodiment from the semiaxial turbine inlet diameter $D_{T,x}$, the radial turbine inlet diameter $D_{T,r}$ as well as the semiaxial and the radial flow inlet cross-section $A_{T,x}$ and $A_{T,r}$.

It may be advantageous to insert variable guide baffles in the semiaxial inflow and rigid baffles in the radial inflow. In this case, the radial flow inlet cross-section $A_{T,r}$ remains constant and the semiaxial flow inlet cross-section $A_{T,x}$ changes as a function of the position of the guide baffles. The minimal value of the $D_v/D_{T,m}$ ratio is reached when the guide baffles are closed in the semiaxial inflow. The maximal value is reached in the opening position of the guide baffle.

In another embodiment, variable guide baffles are provided in the semiaxial as well as in the radial inflow.

Figure 4:
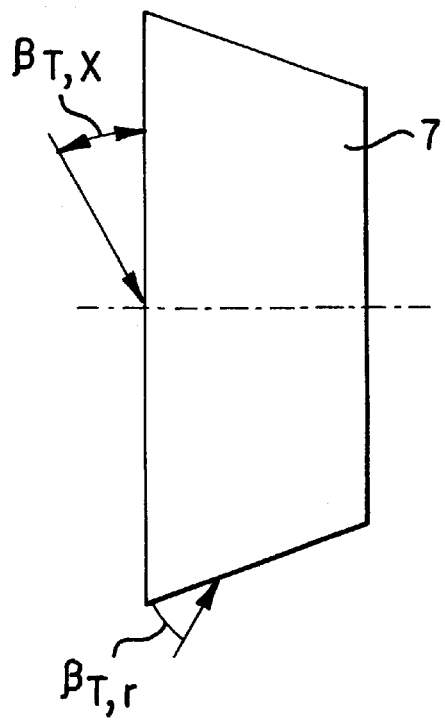
FIG. 4 is a schematic lateral view of a turbine rotor disk with a semiaxial and radial wheel inlet angle, constructed according to preferred embodiments of the present invention.

FIG. 4 shows a semiaxial and a radial wheel inlet angle $\beta_{T,x}$, $\beta_{T,r}$ with respect to the turbine wheel 7. The semiaxial wheel inlet angle $\beta_{T,x}$ is assigned to the semiaxial inflow; the radial wheel inlet angle $\beta_{T,r}$ is assigned to the radial inflow. Both values are constant; they do not change as a function of the position of the variable guide baffles. The radial wheel inlet angle $\beta_{T,r}$ amounts to 90°. From the two wheel inlet angles as well as the radial and the semi-axial flow inlet cross-section, according to the equation $$\beta_{T,m} = \beta_{T,x} + (\beta_{T,r} - \beta_{T,x}) * A_{T,r}/(A_{T,r} + A_{T,x})$$

the variable average wheel inlet angle $\beta_{T,m}$ can be calculated as a function of the radial and the semiaxial flow inlet cross-section $A_{T,r}$ and $A_{T,x}$ which, in a preferred embodiment of the turbine, takes up a minimal value of larger than 20° and a maximal value of smaller than 90°, and is particularly between 25° and approximately 85° to 88°. The minimal value and the maximal value are reached according to the embodiment in the opening position or in the shut-off position of the variable guide baffles.

Furthermore, it may be expedient to dimension the wheel blade ratio between the semiaxial and the radial flow inlet to a value between 0.5 and 1.0.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas turbocharger for an internal-combustion engine whose exhaust gas turbine has a rotor disk with at least one semiaxial and one radial flow inlet cross-section and is equipped with a variable turbine geometry for the variable adjustment of at least one flow inlet cross-section, and having a compressor in the intake system of the internal-combustion engine, the ratio ($D_v/D_{T,m}$) of the compressor outlet diameter ($D_v$) to the average turbine inlet diameter ($D_{T,m}$) according to the adjustment of the variable turbine geometry being variably adjustable between a minimal value and a maximal value, wherein the minimal value is lower than 1.1 and the average turbine inlet diameter ($D_{T,m}$) is calculated according to the equation $$D_{T,m}=D_{T,x}+(D_{T,r}-D_{T,x})*A_{T,r}/(A_{T,r}+A_{T,x})$$

wherein $D_{T,x}$ is the semiaxial turbine inlet diameter $D_{T,r}$ is the radial turbine inlet diameter $A_{T,r}$ is the area of the radial flow inlet cross-section $A_{T,x}$ is the area of the semiaxial flow inlet cross-section, and wherein the ratio of the semiaxial flow inlet cross-section area to the radial flow inlet cross-section area when the semiaxial and radial flow paths are fully open amounts to approximately 0.1.

2. The exhaust gas turbocharger according to claim 1, wherein the minimal value of the ratio ($D_v/D_{T,m}$) of the compressor outlet diameter ($D_v$) to the average turbine inlet diameter ($D_{T,m}$) is lower than 1.0.

3. The exhaust gas turbocharger according to claim 1, wherein the minimal value of the ratio ($D_v/D_{T,m}$) of the compressor outlet diameter ($D_v$) to the average turbine inlet diameter ($D_{T,m}$) is higher than 0.9.

4. The exhaust gas turbocharger according to claim 2, wherein the minimal value of the ratio ($D_v/D_{T,r}$) of the compressor outlet diameter ($D_v$) to the average turbine inlet diameter ($D_{T,m}$) is higher than 0.9.

5. The exhaust gas turbocharger according to claim 1, wherein the maximal value of the ratio ($D_v/D_{T,r}$) of the compressor outlet diameter ($D_v$) to the average turbine inlet diameter ($D_{T,m}$) is between 1.0 and 1.2.

6. The exhaust gas turbocharger according to claim 2, wherein the maximal value of the ratio ($D_v/D_{T,m}$) of the compressor outlet diameter ($D_v$) to the average turbine inlet diameter ($D_{T,m}$) is between 1.0 and 1.2.

7. The exhaust gas turbocharger according to claim 3, wherein the maximal value of the ratio ($D_v/D_{T,m}$) of the compressor outlet diameter ($D_v$) to the average turbine inlet diameter ($D_{T,m}$) is between 1.0 and 1.2.

8. The exhaust gas turbocharger according to claim 1, wherein radial guide baffles with adjustable guide blades are provided as a shut-off device of the variable turbine geometry in the area of the radial flow inlet cross section.

9. The exhaust gas turbocharger according to claim 2, wherein radial guide baffles with adjustable guide blades are provided as a shut-off device of the variable turbine geometry in the area of the radial flow inlet cross section.

10. The exhaust gas turbocharger according to claim 3, wherein radial guide baffles with adjustable guide blades are provided as a shut-off device of the variable turbine geometry in the area of the radial flow inlet cross section.

11. The exhaust gas turbocharger according to claim 5, wherein radial guide baffles with adjustable guide blades are provided as a shut-off device of the variable turbine geometry in the area of the radial flow inlet cross section.

12. The exhaust gas turbocharger according to claim 1, wherein an axial slider is provided as a shut-off device of the variable turbine geometry in the area of the radial flow inlet cross-section.

13. The exhaust gas turbocharger according to claim 2, wherein an axial slider is provided as a shut-off device of the variable turbine geometry in the area of the radial flow inlet cross-section.

14. The exhaust gas turbocharger according to claim 3, wherein an axial slider is provided as a shut-off device of the variable turbine geometry in the area of the radial flow inlet cross-section.

15. The exhaust gas turbocharger according to claim 5, wherein an axial slider is provided as a shut-off device of the variable turbine geometry in the area of the radial flow inlet cross-section.

16. The exhaust gas turbocharger according to claim 8, wherein the maximal value of the ratio ($D_v/D_{T,m}$) of the compressor outlet diameter ($D_v$) to the average turbine inlet diameter ($D_{T,m}$) can be reached when the shut-off device is closed and the minimal value can be reached when the shut-off device is open.

17. The exhaust gas turbocharger according to claim 12, wherein the maximal value of the ratio ($D_v/D_{T,m}$) of the compressor outlet diameter ($D_v$) to the average turbine inlet diameter ($D_{T,m}$) can be reached when the shut-off device is closed and the minimal value can be reached when the shut-off device is open.

18. The exhaust gas turbocharger according to claim 8, wherein the shut-off device of the variable turbine geometry is arranged in an area of the semiaxial flow inlet cross-section.

19. The exhaust gas turbocharger according to claim 12, wherein the shut-off device of the variable turbine geometry is arranged in an area of the semiaxial flow inlet cross-section.

20. The exhaust gas turbocharger according to claim 19, wherein is the ratio ($D_v/D_{T,m}$) of the compressor diameter ($D_v$) to the average turbine inlet diameter ($D_{T,m}$) is lower when the axial slider is closed than when the axial slider is open.

21. The exhaust gas turbocharger according to claim 1, wherein the exhaust gas flows are guided through the semiaxial flow inlet cross-section at a low load range and the exhaust gas flows are guided through the radial flow inlet cross-section in the partial and full load range.

22. The exhaust gas turbocharger according to claim 1, wherein the ratio of the semiaxial flow inlet cross-section to the radial flow inlet cross-section amounts to 0.1 when the semiaxial and radial flow paths are fully open.

23. A method of operating an exhaust gas turbocharger for an internal-combustion engine whose exhaust gas turbine has a rotor disk with at least one semiaxial and one radial flow inlet cross-section and is equipped with a variable turbine geometry for the variable adjustment of at least one flow inlet cross-section, and having a compressor in the intake system of the internal-combustion engine, the ratio ($D_v/D_{T,m}$) of the compressor outlet diameter ($D_v$) to the average turbine inlet diameter ($D_{T,m}$) according to the adjustment of the variable turbine geometry being variably adjustable between a minimal value and a maximal value, wherein the minimal value is lower than 1.1 and the average turbine inlet diameter ($D_{T,m}$) is calculated according to the equation $$D_{T,m}=D_{T,x}+(D_{T,r}-D_{T,x})*A_{T,r}/(A_{T,r}+A_{T,x})$$

wherein $D_{T,x}$ is the semiaxial turbine inlet diameter $D_{T,r}$ is the radial turbine inlet diameter $A_{T,r}$ is the area of the radial flow inlet cross-section $A_{T,x}$ is the area of the semiaxial flow inlet cross-section, said method comprising:

controlling the variable turbine geometry such that the minimal value of the ratio ($D_v/D_{T,m}$) of the compressor outlet diameter ($D_v$) to the average turbine inlet diameter ($D_{T,m}$) is less than 1.1.

24. The method according to claim 23, wherein the ratio of the semiaxial flow inlet cross-section area to the radial flow inlet cross-section area when the semiaxial and radial flow paths are fully open amounts to approximately 0.1.

25. The method according to claim 24, wherein the minimal value of the ratio ($D_v/D_{T,m}$) of the compressor outlet diameter ($D_v$) to the average turbine inlet diameter ($D_{T,m}$) is lower than 1.0.

26. The method according to claim 24, wherein the minimal value of the ratio ($D_v/D_{T,m}$) of the compressor outlet diameter ($D_v$) to the average turbine inlet diameter ($D_{T,m}$) is higher than 0.9.

27. The method according to claim 24, wherein the maximal value of the ratio ($D_v/D_{T,m}$) of the compressor outlet diameter ($D_v$) to the average turbine inlet diameter ($D_{T,m}$) is between 1.0 and 1.2.

* * * * *